United States Patent
Yokoyama et al.

(10) Patent No.: US 6,741,228 B1
(45) Date of Patent: May 25, 2004

(54) DISPLAY APPARATUS

(75) Inventors: Osamu Yokoyama, Shiojiri (JP); Tatsuya Shimoda, Nagano (JP); Satoru Miyashita, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/509,197

(22) PCT Filed: Jul. 23, 1999

(86) PCT No.: PCT/JP99/03979
§ 371 (c)(1),
(2), (4) Date: Mar. 23, 2000

(87) PCT Pub. No.: WO00/05702
PCT Pub. Date: Feb. 3, 2000

(30) Foreign Application Priority Data

Jul. 24, 1998 (JP) .......................................... 10-210013

(51) Int. Cl.$^7$ ................................................ G09G 3/30
(52) U.S. Cl. ............................ 345/76; 345/45; 345/48; 345/77
(58) Field of Search ........................... 345/76, 77, 44, 345/45, 48; 353/31, 38; 349/69

(56) References Cited

U.S. PATENT DOCUMENTS

| | | | | |
|---|---|---|---|---|
| 5,059,000 A | * | 10/1991 | Kaneko et al. | 349/20 |
| 5,418,583 A | * | 5/1995 | Masumoto | 353/38 |
| 5,478,658 A | | 12/1995 | Dodabalapur et al. | |
| 5,674,636 A | | 10/1997 | Dodabalapur et al. | |
| 5,808,410 A | * | 9/1998 | Pinker et al. | 313/493 |
| 5,926,239 A | * | 7/1999 | Kumar et al. | 349/69 |
| 6,078,363 A | * | 6/2000 | Masuda et al. | 348/752 |
| 6,219,111 B1 | * | 4/2001 | Fukuda et al. | 349/5 |
| 6,227,669 B1 | * | 5/2001 | Tiao et al. | 353/31 |
| 6,259,423 B1 | * | 7/2001 | Tokito et al. | 345/76 |
| 6,318,863 B1 | * | 11/2001 | Tiao et al. | 353/31 |

FOREIGN PATENT DOCUMENTS

| | | |
|---|---|---|
| JP | 01-179914 | 7/1989 |
| JP | A-1-179914 | 7/1989 |
| JP | 3-187192 | 8/1991 |
| JP | A-4-308890 | 10/1992 |
| JP | A-7-65618 | 3/1995 |
| JP | 09-180883 | 7/1997 |
| JP | A-9-180883 | 7/1997 |
| JP | A-10-50124 | 2/1998 |
| JP | 10-149881 | 6/1998 |
| JP | 10-187058 | 7/1998 |
| JP | A-10-187058 | 7/1998 |

OTHER PUBLICATIONS

L. J. Rothberg, *Invited Paper: Resonant–Cavity Electroluminescent Backlights,* SID Digest, pp. 231–234.

A. Dodabalapu et al., *Physics and Applications of Organic Microcavity Light Emitting Diodes,* Dec. 15, 1996, J. Appl. Phys. 30 (12), pp. 6954–6964.

* cited by examiner

Primary Examiner—Steven Saras
Assistant Examiner—Fritz Alphonse
(74) Attorney, Agent, or Firm—Oliff & Berridge, PLC

(57) ABSTRACT

There is provided behind an optical modulation panel (101) which is not provided with a color filter a planar light source which is provided with EL elements (100R, 100G and 100B) with a built-in optical resonator structure adapted to emit light in red, green and blue and which are periodically arranged on a single glass substrate (103). Lights of different colors obtained by lighting the EL elements (100R, 100G and 100B) are modulated by an optical modulation panel (101) to obtain a color image.

15 Claims, 3 Drawing Sheets

DISPLAY APPARATUS

BACKGROUND OF THE INVENTION

1. Field of the Invention

The present invention relates to the construction of a light source apparatus in a display apparatus for obtaining an image by modulating light from a light source, and to the construction of a display apparatus using the light source apparatus.

2. Description of Related Art

In a known display apparatus, an optical modulation panel such as a liquid crystal panel is combined with a light source, and light from the light source is modulated by the optical modulation panel in accordance with image information to effect image formation. In such a display apparatus, it is required that the size of the light source be reduced to thereby reduce the size of the display apparatus, and that a display of high luminance be achieved.

As a first example, Japanese Patent Laid-Open No. 5-13049 discloses a technique for achieving a reduction in the size of a projection type liquid crystal display apparatus which enlarges and projects an image of a liquid crystal panel to perform display.

The above-mentioned publication discloses the construction of a display apparatus in which three liquid crystal panels are arranged around a dichroic prism, and in which the liquid crystal display elements are illuminated by flat fluorescent tubes which are arranged behind the liquid crystal panels and which differ in light-emission color, an image in the different colors synthesized by the dichroic prism being projected onto a screen by a projection lens.

As a second example of a technique for reducing the size of a projection type liquid crystal display apparatus, there is a construction in which only one liquid crystal panel is used, and in which the liquid crystal display element is illuminated from behind by a lamp such as a metal halide lamp, an image of the liquid crystal panel being projected onto a screen by a projection lens.

However, in the first example, in which three liquid crystal panels are used, a high cost is involved. Further, it is necessary to provide an adjusting mechanism for restraining misregistration of the images of the three panels, which makes it difficult to achieve a further reduction in the size of the display apparatus.

In the second example, in which a white light source is used, it is necessary to provide the pixels of the liquid crystal panels with color filters to project a color image. To generate colors, three pixels of red, green and blue are required, with the result that the resolution of the displayed image deteriorates. Further, in a color filter, the light of a wavelength other than that of the transmitted light is absorbed, so that the displayed image is rather dark. Furthermore, high voltage is required to light the metal halide lamp, with the result that a large power source circuit is involved, which makes it difficult to achieve a reduction in the size of the display apparatus.

SUMMARY OF THE INVENTION

The present invention has been made with a view toward solving the above problems. It is an object of the present invention to provide a display apparatus which uses a minimum number of liquid crystal panels to reduce the size of the display apparatus and whose liquid source apparatus is made compact to thereby achieve a reduction in the size of the display apparatus as a whole.

Another object of the present invention is to provide a display apparatus in which light from the light source apparatus is used in high utilization efficiency and which can display an image with high resolution even though a minimum number of liquid crystal panels are used.

In accordance with the present invention, there is provided a display apparatus that may include a plane optical modulation panel, and a planar light source arranged behind the plane optical modulation panel and having in a plane substantially parallel to the plane of the panel a first light emission region that may include an electroluminescent element having an optical micro resonator emitting light in the wavelength region of a first color and a second light emission region that may include an electroluminescent element having an optical micro resonator emitting light in the wavelength region of a second color different from the first color.

DESCRIPTION OF THE PREFERRED EMBODIMENTS

Figure 1:
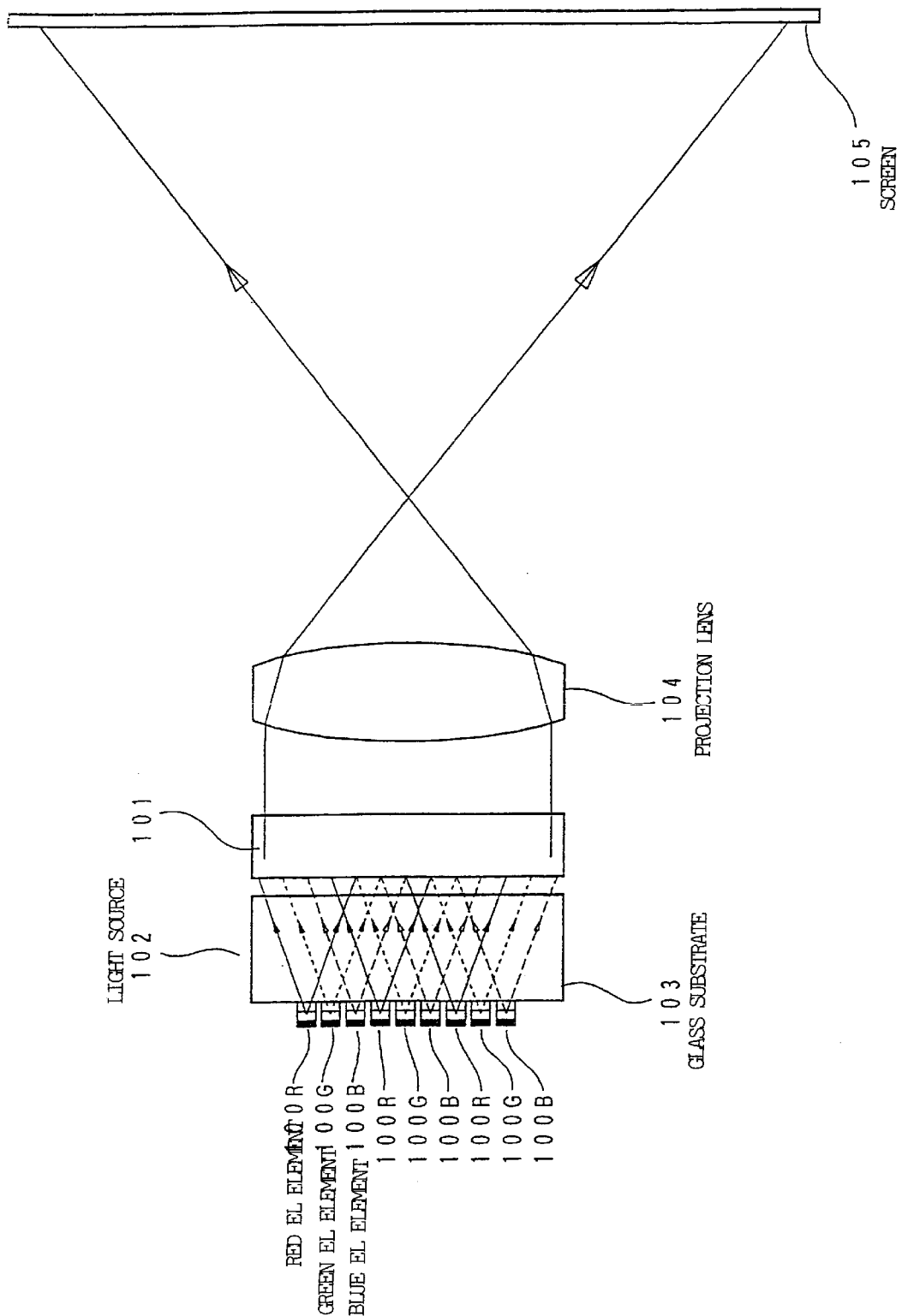
FIG. 1 is a sectional view showing an example of the general construction of the display apparatus of the present invention.

The display apparatus of the present invention may be provided such that, in a planar light source, there are provided in a plane substantially parallel to a plane optical modulation panel a plurality of light emission regions of different light emission colors including electroluminescent elements each provided with a micro resonator structure.

In the above construction, a planar light source in the form of a single flat light source is capable of emitting lights of a plurality of colors, and it is possible to illuminate an optical modulation panel, so that it is possible to achieve a reduction in the size of the display apparatus. Further, due to the fact that the electroluminescent elements are provided with optical resonator structures, the light emission spectrum of each light emission color can be made narrow, so that it is possible to enhance the purity of the color of the display color. Further, by enhancing the directivity of the radiant light, the quantity of light that can be supplied to the optical modulation panel or transmitted therethrough is augmented, whereby it is possible to form a bright display apparatus.

More preferably, a planar light source can be obtained which is of a structure having in addition to the first and second light emission regions a third light emission region that may include an electroluminescent element emitting light in the wavelength region of a different light emission color and which is capable of emitting lights of three colors, for example, of R, G and B. More specifically, it is desirable for the planar light source to adopt a construction in which there are provided a set of light source elements that may include a first organic electroluminescent element emitting light in a color of the red region in correspondence with a first light emission region, a second organic electroluminescent element emitting light in a color of the green region in correspondence with a second light emission region, and a third organic electroluminescent element emitting light in a color of the blue region in correspondence with a third light emission region, and in which each of the first, second and third organic electroluminescent element is provided with an optical micro resonator, the plurality of light source elements being arranged side by side on a same substrate which is substantially parallel to the optical modulation panel.

As the optical modulation panel, a panel is used which uses a medium whose optical characteristics vary according to an external field corresponding to image information, and, more preferably, a liquid crystal panel, and, more specifically, a liquid crystal panel which is provided with nematic liquid crystal, ferroelectric liquid crystal, antiferroelectric liquid crystal, polymer dispersion liquid crystal or the like is used.

As the electroluminescent element (EL element) constituting the light emission region, it is more desirable to use an organic electroluminescent element using an organic material or organic polymer material as the light emission material.

In a preferable form of the display apparatus of the present invention, the pattern configuration of the light emission region due to the electroluminescent element is stripe-like. In the above form, it is possible to arrange the organic electroluminescent elements of the different colors in high density, and it is easy to uniformalize the intensity distribution of the illumination light illuminating the optical modulation panel. Apart from this, it is possible to use various patterns taking into account the size of the planar light source, the combination of the light emission colors, the manufacturing process, etc.

Further, in a preferable form of the display apparatus of the present invention, to adjust the color in which the optical modulation panel is illuminated, there is provided a controller capable of independently controlling the current supplied to the electroluminescent element corresponding to each light emission region. In this form, it is possible to adjust the color needed, and to compensate for the off-balance in color due to deterioration of the electroluminescent element.

In a preferable form of the display apparatus of the present invention, images corresponding to the colors of the light emission regions are displayed in time sequence on the optical modulation panel, and, in synchronism with the display period of the image corresponding to each color, the electroluminescent element of the color emits light. In particular, in the display apparatus provided with an electroluminescent element emitting red light, an element emitting green light, and an electroluminescent element emitting blue light, images of red, green and blue components are displayed in time sequence on the optical modulation panel; when the red component is being displayed, the electroluminescent element of the red light emission emits light; when the green component is being displayed, the electroluminescent element of the green light emission emits light; and when the blue component is being displayed, the electroluminescent element of the blue light emission emits light.

In the above construction, even when display is effected by using only one optical modulation panel, it is possible to effect color display without using a color filter, which involves a deterioration in light transmissivity and resolution, in the optical modulation panel, so that it is possible to provide a small-sized display apparatus which is bright and which provides high resolution.

The display apparatus of the present invention is applicable to both direct-view type and projection type apparatuses. In particular, by utilizing the reduction in the size and thickness of the planar light source, it is possible to use it as a direct-view type display apparatus or liquid crystal projector, realizing an information apparatus of a simple structure and light weight. Further, it is possible to use it as a projection type display apparatus, for example, a projection type liquid crystal display apparatus, which is provided with a lens for enlarging and displaying an image displayed on an optical modulation panel such as a transmission type liquid crystal display element illuminated from behind by a light source.

An embodiment of the display apparatus of the present invention will now be described in more detail with reference to the drawings, taking as an example a projection type liquid crystal display apparatus using a planar light source provided with an organic electroluminescent element.

Figure 2:
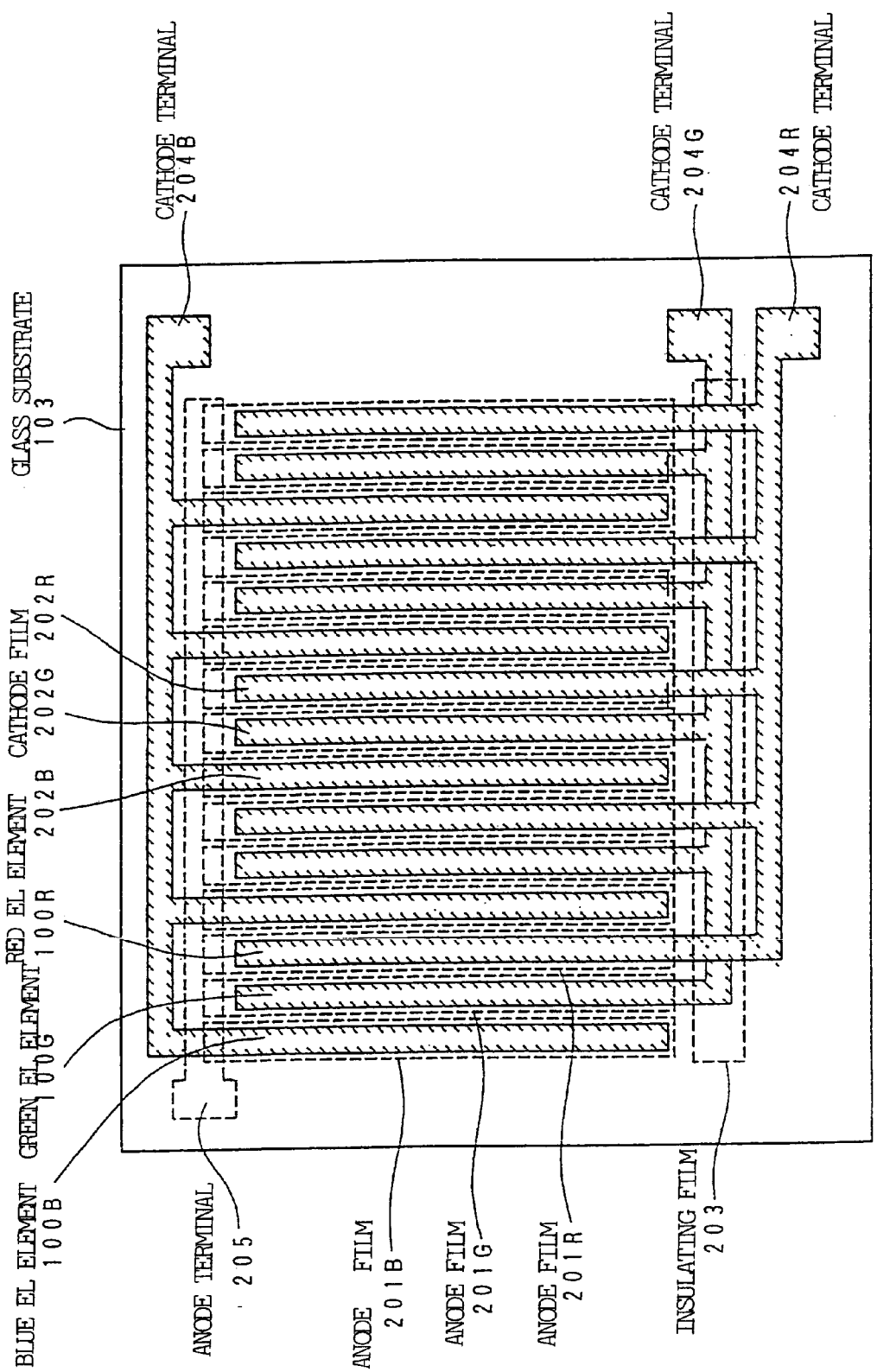
FIG. 2 is a plan view showing an example of the construction of a light source constituting the display apparatus of the present invention.
Figure 3:
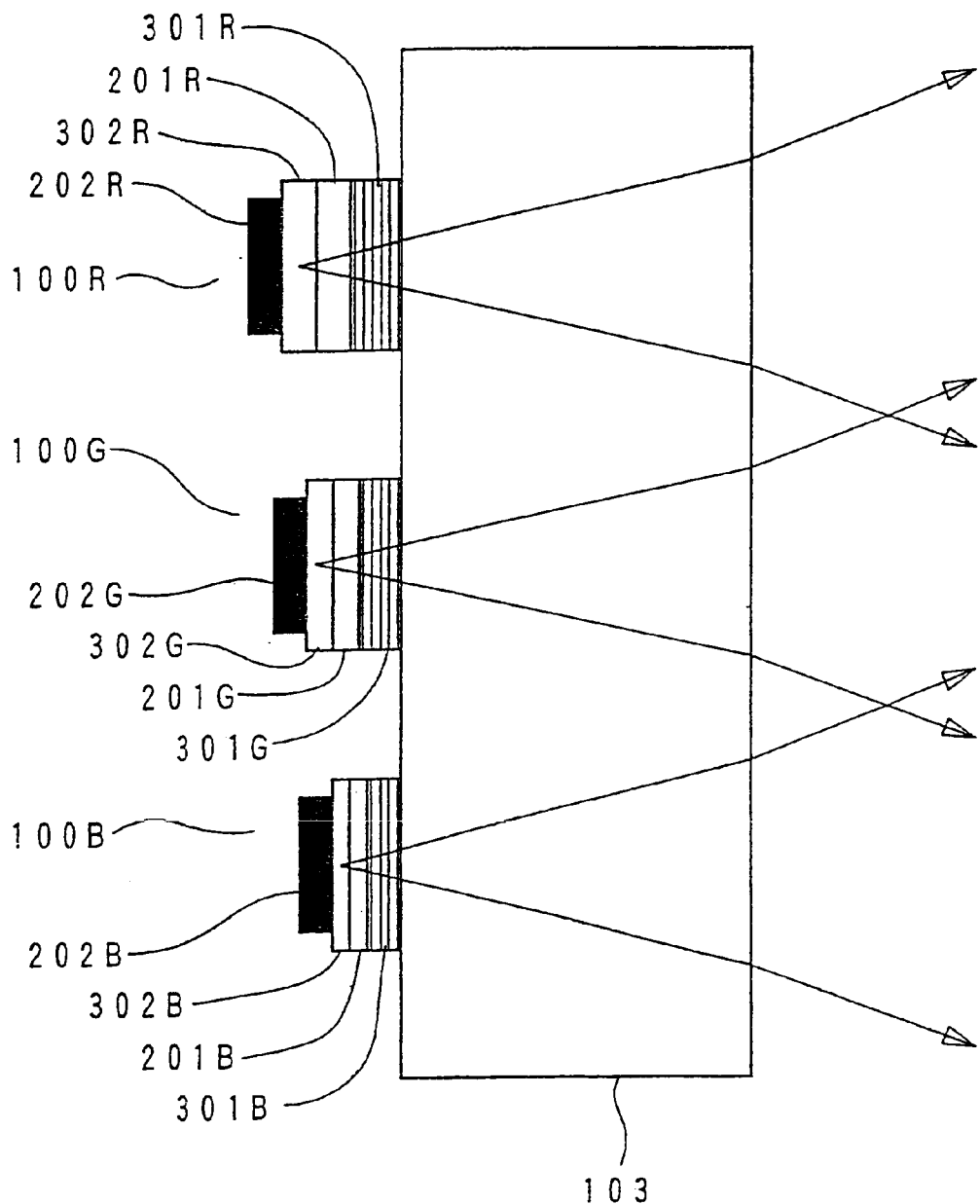
FIG. 3 is a sectional view showing an example of the construction of a light source constituting the display apparatus of the present invention.

FIG. 1 is a sectional view of a main optical system constituting a display apparatus, and FIG. 2 is a diagram showing a plan structure of the planar light source portion. FIG. 3 is a sectional view of the portion around the electroluminescent element (hereinafter referred to as EL element) in the planar light source (the portion with three organic EL elements extracted).

A light source 102 is arranged behind a single liquid crystal panel 101 (liquid crystal display element) with no built-in color filter as the plane optical modulation panel.

In the light source (planar light source) 102, a plurality of sets of elements are periodically arranged on a glass substrate 103, each set comprising an organic EL element R emitting red light, an organic EL element G emitting green light, and an organic EL element B emitting blue light.

As shown in FIGS. 2 and 3, the organic EL elements are formed by stacking on the glass substrate 103 half mirror layers 301R, 301G and 301B comprising dielectric multi-layer films (not shown), anode films 201R, 201G and 201B formed of transparent conductive films such as ITO thin films, light emission layer structures 302R, 302G and 302B comprising organic thin films, and cathode films 202R, 202G and 202B formed of metal thin films of Mg:Ag alloy or the like. To improve the light emission efficiency, the light emission layer structures are preferably formed by stacking from the anode side organic thin films having the functions of a hole injection layer (hole transport layer), a light emission layer and an electron injection layer (electron transport layer). The material of the light emission layer may be a low molecular weight or high molecular weight organic light emission material. The red EL element 100R, the green EL element 100G and the blue EL element 100B are electrically independent, forming light emission regions of the different light emission colors. Light is emitted from the portion where the light emission layer structure is held between the cathode and the anode.

The cathode films 202R, 202G and 202B are connected to cathode terminals 204R, 204G and 204B supplying electric current to the organic EL elements of the different colors. Where wirings are superimposed on each other, an insulating film 203 is provided between the wirings (in the thickness direction). On the other hand, the anode films 201R, 201G and 201B of the organic EL elements of the different colors are connected to a common anode terminal 205 and supplied with a common electric potential.

The half mirror layers 301R, 301G and 301B comprising dielectric multi-layer films and metal films 202R, 202G and 202B constituting cathodes form an optical resonator, and light of a wavelength selected by the resonator is emitted with strong directivity in a direction perpendicular to the glass substrate surface. Thus, the distance between the half mirror layers and the cathodes varies in the organic EL element of each color according to the wavelength of the light it emits, so that the thickness of the anode film and the thickness of the light emitting layer vary in the elements of the different colors.

Thought not shown, by providing a circuit for controlling the current supplied to the organic EL element of each color independently of the organic EL element of each color, it is possible to adjust the balance of the different light emission colors, or to compensate for the off-balance in color due to a deterioration in the organic EL element.

In the liquid crystal panel 101, which is the optical modulation panel, a red component image, a green component image and a blue component image are displayed in time sequence within, for example, a one-field time, to thereby generate a color image. The lighting of the organic EL elements is controlled such that the red EL element R lights when the red component image is being displayed, that the green EL element G lights when the green component image is being displayed, and that the blue EL element B lights when the blue component image is being displayed, The image displayed on the liquid crystal panel 101 is enlarged by a projection lens 104 and projected onto a screen 105.

Since each organic EL element in the light source 10 has a built-in optical resonator, the spectrum of the light emitted from the organic EL element is narrow, and it is possible to project a color image of high purity. Further, as an effect of the optical resonator, the directivity of the light emitted from the organic EL element is strong in the frontal direction of the organic EL element, so that it is possible to augment the quantity of light that can be transmitted through the projection lens, whereby it is possible to project a bright image onto the screen.

The display apparatus of the construction as shown in FIG. 1 is a display apparatus which projects an image displayed on a liquid crystal panel. Apart from this, it is also possible to form a display apparatus in which a liquid crystal panel is arranged on the projection lens side with respect to the front focus of the projection lens, and in which the projection lens is view from the opposite side of the liquid crystal panel to observe an enlarged virtual image of the liquid crystal panel.

In the following, a specific embodiment of the present invention will be described.

EMBODIMENT

A case will be considered in which the display region of the liquid crystal panel (liquid crystal display element) 101 has a lateral dimension of 18.3 mm and a longitudinal dimension of 13.7 mm (0.9 inches in diagonal).

It is necessary that the period of each organic EL element should be a period which does not generate Moire as a result of the mutual action with the pixel structure of the liquid crystal panel. For example, suppose the width of the light emitting portion of each organic El element is 50 $\mu$m, and the pitch is 100 $\mu$m. To uniformalize as much as possible the intensity distribution of the light from the organic EL elements arranged with this pitch before it is applied to the liquid crystal panel, the thickness of the glass substrate 103 on which the organic EL elements are formed is approximately 0.8 mm.

To prevent the generation of Moire, it is also effective to incline to some degree the stripe direction of the organic EL elements with respect to the periodical pixel structure of the liquid crystal panel.

It is possible magnify by approximately 10 times an image displayed on the liquid crystal panel 101 by the projection lens 104 and project an image of 9 inches in diagonal onto the screen 105.

As described above, in the display apparatus of the present invention, a planar light source which has a built-in optical resonator structure on a single substrate and in which organic EL elements emitting light in red, green and blue are periodically arranged is arranged behind a plane optical modulation panel, whereby the planar light source in the form of a single flat light source can emit light in a plurality of colors, and the optical modulation panel can be illuminated, thereby achieving a reduction in the size of the display apparatus. Further, due to the fact that the electroluminescent element is provided with an optical resonator structure, it is possible to form a bright display apparatus of high luminance. Further, using an optical modulation panel such as a liquid crystal panel, the organic EL elements of red, green and blue are sequentially lighted in synchronism with images displayed in color sequence in the panel, whereby it is possible to project a bright image of high resolution by using a small-sized projection type display apparatus (or projector).

INDUSTRIAL APPLICABILITY

The display apparatus of the present invention is suitably applicable to electronic apparatuses such as a laptop personal computer (PC) which is required to provide high quality image display, television, view-finder type or monitor-direct-view type video tape recorder, car navigation apparatus, electronic notebook, electronic calculator, word processor, engineering work station (EWS), mobile phone, picture phone, POS terminal, pager, apparatus equipped with a touch panel, and projection type display apparatus such as liquid crystal projector.

What is claimed is:

1. A display apparatus, comprising:
   a plane optical modulation panel;
   a planar light source arranged facing one surface of the plane optical modulation panel and having, in a plane substantially parallel to the plane optical modulation panel, a first light emission region that includes an electroluminescent element having an optical resonator emitting light in a first color, and a second light emission region that includes an electroluminescent element having an optical resonator emitting light in a second color different from the first color, each of the light emission regions having different thickness, the light emitted from the resonators having directivity in the frontal direction thereof,
   a projection lens arranged at a frontal position of the plane optical modulation for enlarging images formed on the plane optical modulation panel, the projection lens projecting the images onto a screen; and
   a controller that independently controls electric current supplied to the electroluminescent elements of the different colors to adjust the color in which the optical modulation panel is illuminated.

2. The display apparatus according to claim 1, the plane optical modulation panel is a liquid crystal panel.

3. The display apparatus according to claim 1, the pattern configuration of the light emission regions being stripe-like.

4. The display apparatus according to claim 1, the light emission regions corresponding to the respective colors, emitting light to generate a color image in synchronism with the period in which images of different color components in the optical modulation panel are displayed.

5. A display apparatus, comprising:

a plane optical modulation panel;

a planar light source arranged facing one surface of the optical modulation panel and having, in a plane substantially parallel to the plane optical modulation panel, a first light emission region that includes an electroluminescent element having an optical resonator emitting light in a first color, a second light emission region that includes an electroluminescent element having an optical resonator emitting light in a second color different from the first color, and a third light emission region including an electroluminescent element having an optical resonator emitting light in a third color different from the first and second colors, each of the light emission regions having different thickness, the light emitted from the resonators having directivity in the frontal direction thereof;

a projection lens arranged at a frontal position of the plane optical modulation for enlarging images formed on the plane optical modulation panel, the projection lens projecting the images onto a screen; and a controller that independently controls electric current supplied to the electroluminescent elements of the different colors to adjust the color in which the optical modulation panel is illuminated.

6. The display apparatus according to claim 5, the light source including a set of light source elements including the first organic electroluminescent element emitting light in a color of the red region, the second organic electroluminescent element emitting light in a color of the green region, and the third organic electroluminescent element emitting light in a color of the blue region, each of the first, second and third organic electroluminescent elements being provided with an optical resonator, and the set of light source elements being arranged side by side on a same substrate.

7. The display apparatus according to claim 6, the pattern configuration of the light emission regions formed by the organic electroluminescent elements being stripe-like.

8. The display apparatus according to claim 6, images of red, green and blue components being displayed in time sequence on the optical modulation panel, the first organic electroluminescent element emitting light when the red component is being displayed, the second organic electroluminescent light element emitting light when the green component is being displayed, and the third organic electroluminescent element emitting light when the blue component is being displayed, to thereby generate a color image.

9. The display apparatus according to claim 5, the plane optical modulation panel is a liquid crystal panel.

10. The display apparatus according to claim 5, the pattern configuration of the light emission regions being stripe-like.

11. The display apparatus according to claim 5, the light emission regions corresponding to the respective colors, emitting light to generate a color image in synchronism with the period in which images of different color components in the optical modulation panel are displayed.

12. A display apparatus, comprising:

a plane optical modulation panel; and a planar light source arranged facing one surface of the optical modulation panel and having, in a plane substantially parallel to the plane of the optical modulation panel, a first light emission region that includes an electroluminescent element having an optical resonator emitting light in a first color, a second light emission region that includes an electroluminescent element having an optical resonator emitting light in a second color different from the first color, and a third light emission region including an electroluminescent element having an optical resonator emitting light in a third color different from the first and second colors, each of the first, second and third light emission regions having a light emission region of red light emission, a light emission region of green light emission, and a light emission region of blue light emission, each of the light emission regions having different thickness, the light emitted from the resonators having directivity in the frontal direction thereof, a projection lens arranged at a frontal position of the plane optical modulation for enlarging images formed on the plane optical modulation panel, the projection lens projecting the images onto a screen; and a controller that independently controls electric current supplied to the electroluminescent elements of the different colors to adjust the color in which the optical modulation panel is illuminated.

13. The display apparatus according to claim 12, the plane optical modulation panel is a liquid crystal panel.

14. The display apparatus according to claim 12, the pattern configuration of the light emission regions being stripe-like.

15. The display apparatus according to claim 12, the light emission regions corresponding to the respective colors, emitting light to generate a color image in synchronism with the period in which images of different color components in the optical modulation panel are displayed.

* * * * *